UNITED STATES PATENT OFFICE.

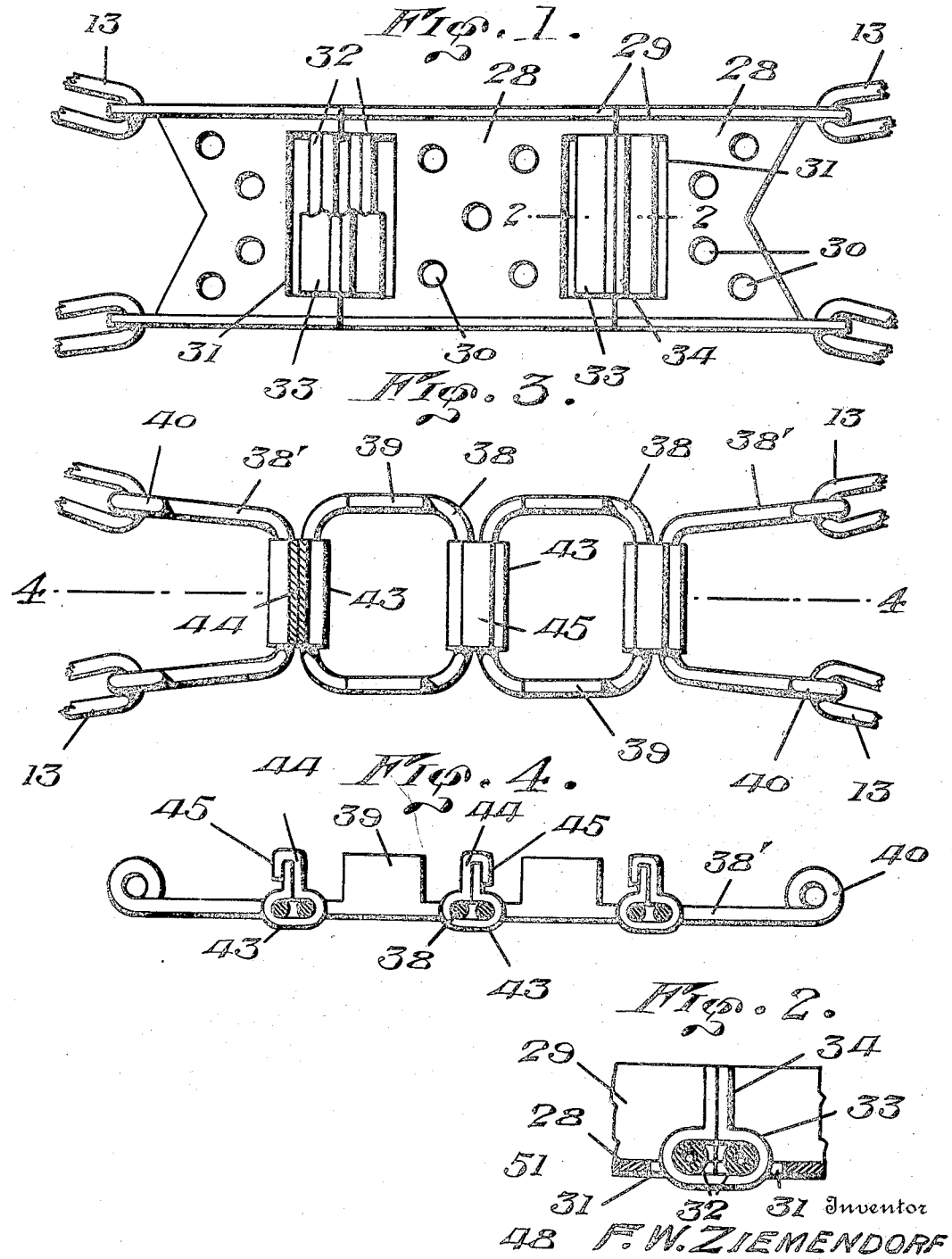

FRED W. ZIEMENDORF, OF STEVENS POINT, WISCONSIN.

NON-SKID DEVICE.

1,370,177.  Specification of Letters Patent.  Patented Mar. 1, 1921.

Application filed May 11, 1920. Serial No. 380,558.

*To all whom it may concern:*

Be it known that I, FRED W. ZIEMENDORF, citizen of the United States, residing at Stevens Point, in the county of Portage and State of Wisconsin, have invented certain new and useful Improvements in Non-Skid Devices; and I do hereby declare the following to be a full, clear, and exact description of the invention, such as will enable others skilled in the art to which it appertains to make and use the same.

The present invention relates to non-skid devices and protectors or chains for pneumatic tires of automobiles and other vehicles, and aims to provide a novel and improved device of that character which prevents the wheel slipping and to enhance traction in a practical and efficient manner and increase the life of the tire.

One of the objects of the invention is the provision of such a device including a shoe of novel jointed construction and form to extend transversely across the tread of the tire.

Another object is the provision of a novel and improved coupling or fastener for conveniently attaching and securely holding the ends of each side chain together, in order that the terminals of the side chain can not only be pulled together tightly, but will also be held coupled without danger of accidental uncoupling or loosening of the device.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the shoe laid flat, portions being broken away.

Fig. 2 is a sectional detail taken on the line 2—2 of Fig. 1.

Fig. 3 is a plan view of still another modified form of shoe laid flat, portions being shown in section.

Fig. 4 is a longitudinal section on the line 4—4 of Fig. 3.

The device, like ordinary non-skid chains, has an annular set of cross members to extend across the tread of the tire, and in the present device, these members comprise shoes.

A flexible shoe of one form is shown in Figs. 1 and 2, the same being composed of sections, each of which is of channel-shape, being provided with a longitudinally curved web 28 to fit the transverse curvature of the tire across the tread thereof, and each section has outstanding flanges 29 along the longitudinal edges of the web to facilitate traction and prevent slipping. The webs 28 have apertures or openings 30, and the adjacent ends of the webs 28 are hingedly connected. Thus, said webs are provided at the adjacent ends with transverse slots 31 providing transverse hinge bars 32, which are bent transversely of themselves, into circular cross section, as best seen in Fig. 2, whereby to fit for turning movement in the hinge loops or members 33. Said loops or members are bent from sheet metal and each one of them embraces a pair of the hinge bars 32, thereby hingedly connecting the adjacent ends of the corresponding shoe sections and permitting said sections to bend or swing relatively, enabling the shoe to flex with the tire casing. The hinge loop or member 33 has its end portions 34 bent at an angle to project outwardly and bearing against one another, providing traction portions extending transversely between the flanges 29 and at the hinges of the shoe sections, to prevent transverse slipping of the wheel. The loops or members 33 thus not only hingedly connect the shoe sections, but also provide traction means.

Figs. 3 and 4 show a further modification of flexible shoe, the sections of which are made of wire or similar stock. Thus, there are two intermediate O-shaped sections 38 and end sections 38' of U-shape, which are bent from wire, and the terminals of the sections 38' are bent into eyes or loops 40 for the engagement of the links 13 for holding the shoe in place. The longitudinal members of the sections 38 have outstanding flanges 39 to afford good traction and to prevent longitudinal slipping of the wheel, and the transverse portions of the several sections are hingely connected somewhat similar to the hinge connections as shown in Figs. 1 and 2. Thus, hinge loops or members 43 embrace the pairs of adjacent transverse members of the sections 38 and 38', to hingedly connect the sections, and said loops or members have their terminal portions extending outwardly and disposed flatly one against the other, whereby said end portions 44 provide traction means to prevent transverse slipping of the wheel. As shown, one end portion 44 of each pair is extended and bent back, as at 45, over the other end portion, whereby to lock the portions together, to prevent the loop or member 43 opening under strains which tend to pull the sections apart.

Having thus described the invention, what is claimed as new is:—

1. A non-skid shoe to extend transversely across the tire comprising sections disposed end to end and having outstanding traction portions, and means hingedly connecting the adjacent ends of said sections and also having outstanding traction portions.

2. A non-skid shoe to extend transversely across a tire comprising sections having adjacent transverse hinge bars at their ends arranged in pairs, and means embracing said hinge bars for hingedly connecting the sections, said sections having outstanding longitudinal traction portions between their ends and said means having outstanding traction portions transversely between the sections.

3. A non-skid shoe to extend transversely across a tire, comprising sections having adjacent transverse hinge bars, and looped hinged members embracing the adjacent hinge bars for hingedly connecting the sections.

4. A non-skid shoe to extend transversely across a tire comprising sections having adjacent transverse hinge bars, and looped hinged members embracing the adjacent hinge bars for hingedly connecting the sections, said members having outstanding traction portions.

In testimony whereof I have signed my name to this specification in the presence of two subscribing witnesses.

FRED W. ZIEMENDORF.

Witnesses:
R. N. McDONALD,
BERNARD NIYBOR.